US007821535B2

(12) United States Patent
Morita et al.

(10) Patent No.: US 7,821,535 B2
(45) Date of Patent: Oct. 26, 2010

(54) INFORMATION PROCESSING METHOD AND APPARATUS

(75) Inventors: Kenji Morita, Yokohama (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1127 days.

(21) Appl. No.: 11/491,945

(22) Filed: Jul. 25, 2006

(65) Prior Publication Data
US 2007/0024712 A1 Feb. 1, 2007

(30) Foreign Application Priority Data
Jul. 29, 2005 (JP) ............................. 2005-221466

(51) Int. Cl.
*H04N 17/00* (2006.01)
(52) U.S. Cl. .................. 348/187; 348/180; 348/208.99; 348/94; 348/286; 382/151; 382/275
(58) Field of Classification Search .................. 348/180, 348/187, 188, 189, 208.99, 211.9, 94, 286; 382/151, 275; 358/504
See application file for complete search history.

(56) References Cited
U.S. PATENT DOCUMENTS

| 6,437,823 | B1 * | 8/2002 | Zhang .......................... 348/187 |
| 6,728,417 | B1 | 4/2004 | Hara et al. .................... 382/275 |
| 6,816,187 | B1 | 11/2004 | Iwai et al. .................... 348/187 |
| 6,985,175 | B2 | 1/2006 | Iwai et al. .................... 348/187 |
| 7,023,473 | B2 | 4/2006 | Iwai et al. .................... 348/187 |
| 2002/0113878 | A1 | 8/2002 | Iwai et al. .................... 348/187 |
| 2005/0069196 | A1 * | 3/2005 | Uchiyama et al. ............ 382/154 |

FOREIGN PATENT DOCUMENTS

| JP | 8-201021 | 8/1996 |
| JP | 2000-241120 | 9/2000 |
| JP | 2000-350239 | 12/2000 |
| JP | 2002-27507 | 1/2002 |
| JP | 2003-307466 | 10/2003 |
| JP | 2004-288148 | 10/2004 |

OTHER PUBLICATIONS

S. Uchiyama, et al., "MR Platform: A Basic Body on Which Mixed Reality Applications are Built," Proc. IEEE/ACM International Symp. on Mixed and Augmented Reality (ISMAR 2002), pp. 246-253, 2002.
Z. Zhang, "A Flexible New Technique for Camera Calibration," Microsoft Technical Report MSR-TR-98-71, pp. 1-21, 1998.
Japanese Office Action issued Nov. 10, 2008, in Japanese Application No. 2005-221466.

* cited by examiner

*Primary Examiner*—David L Ometz
*Assistant Examiner*—Jean W Désir
(74) *Attorney, Agent, or Firm*—Fitzpatrick, Cella, Harper & Scinto

(57) ABSTRACT

Indices are detected from a pattern image including a plurality of indices, and first positions of the detected indices on the captured image are calculated. Using parameters associated with an image capturing apparatus, second positions indicating the positions of the indices on the captured image are calculated. While a parameter of a radial distortion of a lens of the image capturing apparatus is fixed, the parameters other than the parameter of the radial distortion of the lens of the image capturing apparatus are corrected using the differences between the first positions and the second positions. Using the corrected parameters, third positions indicating the positions of the indices on the captured image are calculated. Using the differences between the first positions and the third positions, the parameter of the radial distortion is corrected.

3 Claims, 5 Drawing Sheets

GRIDS FREE FROM DISTORTION

BARREL DISTORTION

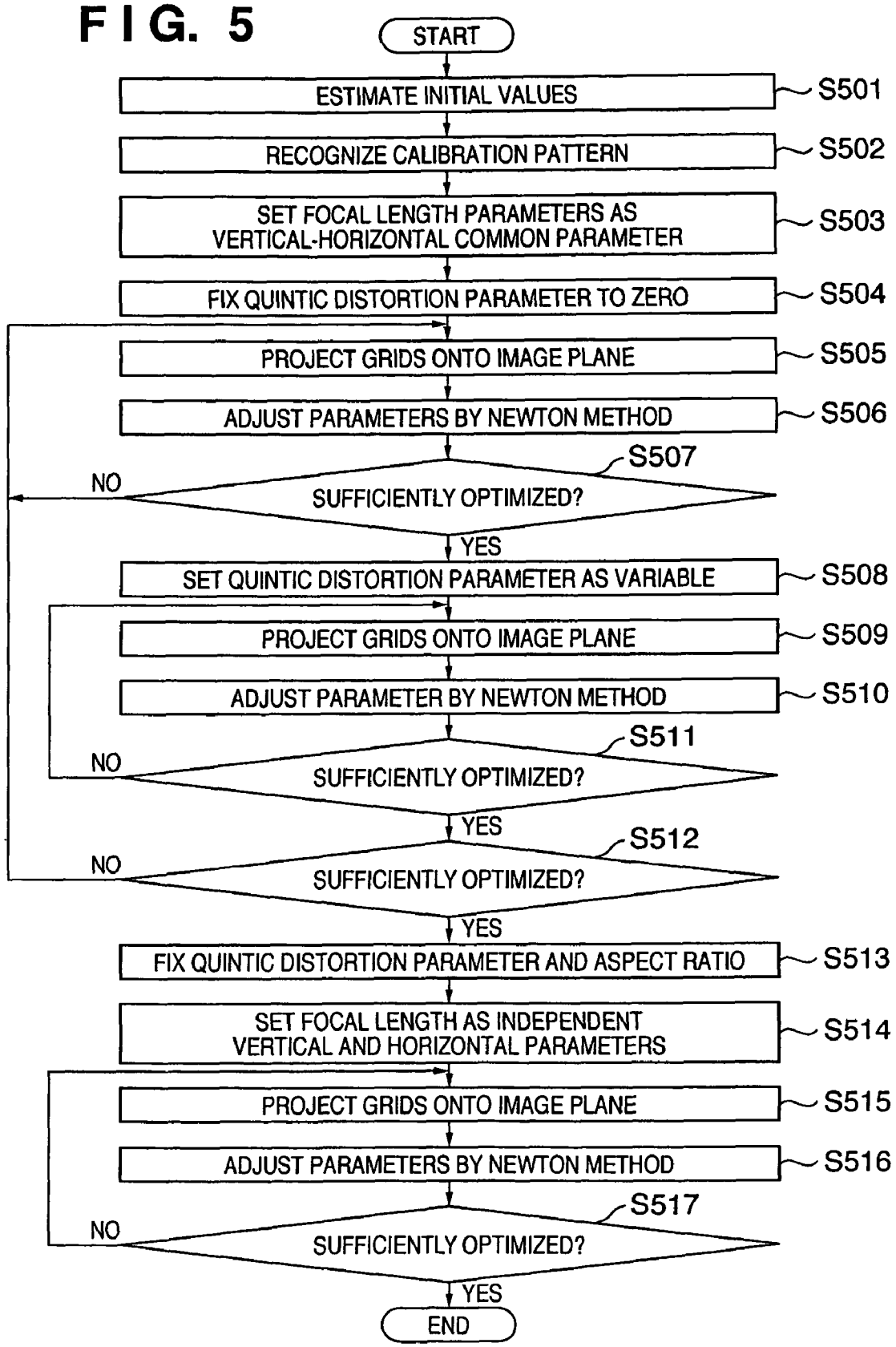

INFORMATION PROCESSING METHOD AND APPARATUS

BACKGROUND OF THE INVENTION

1. Field of the Invention

The present invention relates to a technique for calibrating parameters associated with an image capturing apparatus.

2. Description of the Related Art

Since a lens of a camera which is generally used is not the one of an ideal pin-hole camera, an image captured by such camera often includes distortions such as a barrel distortion and the like caused by the lens, and it is not an ideal perspective projection. Hence, when image processing is executed by a computer or the like, processing for calibrating distortions of an image is prevalently executed.

Conventionally, for such processing, a method of capturing an image of a calibration pattern, and calculating distortions and perspective projection conversion parameters of a camera from the image is used. S. Uchiyama, K. Takemoto, K. Satoh, H. Yamamoto, and H. Tamura: "MR Platform: A basic body on which mixed reality applications are built," Proc. IEEE/ACM Int'l Symp. on Mixed and Augmented Reality (ISMAR 2002), pp. 246-253, 2002 describes such conventional image distortion calibration method.

For example, the following equations are known as a distortion model:

$$x' = k_2 \times (x_i - c_x)$$
$$y' = k_2 \times (y_i - c_y)$$
$$d = 1 - k_1(x'^2 + y'^2)$$
$$x_o = x' \times d + c_x$$
$$y_o = y' \times d + c_y \quad (1)$$

where $(x_i, y_i)$ represents an ideal position free from any distortion, $(x_o, y_o)$ represents a distorted position, and $(c_x, c_y)$ represents the distortion central position.

A basic sequence for estimating parameters is as follows.

A) Initial values ($c_x$, $c_y$, $k_1$, and $k_2$) are prepared.

B) From grid-like observation points $(x_o, y_o)$, points $(x_c, y_c)$ after distortion correction are calculated using distortion parameters of process A).

C) A homography used to convert the grid points to $(x_c, y_c)$ is calculated by the least square method.

D) $(x_h, y_h)$ required to convert the grid points by the homography of process C) is calculated.

Note that processes C) and D) correspond to a manipulation for linearly approximating $(x_c, y_c)$ in which the distortion remains.

E) $(x_h, y_h)$ is inversely corrected by the distortion parameters of process A) to calculate $(x_{ho}, y_{ho})$.

F) Using the differences between $(x_o, y_o)$ and $(x_{ho}, y_{ho})$, the distortion parameters are optimized by the Newton method.

However, in order to calculate the camera distortion as described above, the precondition for, e.g., capturing an image of known markers which are distributed on a plane perpendicular to the optical axis of the camera is required, and when the calibration pattern is placed not perpendicularly, errors occur.

Since the perspective projection conversion parameters of the camera must be separately calculated later, the calibration must be done twice to calculate the distortion parameters and perspective projection conversion parameters. For the second calibration, it is desirable to capture not only an image of the perpendicular calibration pattern but also images of the calibration pattern of a plurality of orientations, resulting in troublesome operations.

FIG. 3 is a flowchart of the aforementioned conventional distortion parameter calculation processing.

An actually captured image is acquired by capturing an image of a calibration pattern (step S301). Indices (observation points) in the acquired captured image are detected and their positions are acquired (step S302). Next, calibration parameters (distortion parameters) are calculated by the above-mentioned method (step S303). The calculated calibration parameters are saved (step S304).

Furthermore, after the processing according to the flowchart in FIG. 3, the perspective projection parameters of the camera must be calculated.

The above example does not consider a case wherein an aspect ratio includes errors. When the aspect ratio is not accurately 1:1, distortion parameters include errors.

As another prior art, Microsoft technical report: Technical Report MSR-TR-98-71 is available. This reference discloses a method of simultaneously calculating the perspective projection parameters of the camera and the distortion parameters. However, since the aspect ratio is not considered in this reference, errors of the aspect ratio cause those of the perspective projection parameters of the camera and the distortion parameters.

SUMMARY OF THE INVENTION

An object of the present invention is to provide a technique for solving the problem that errors of an aspect ratio adversely influence the precision of distortion parameters in parameter estimation of a camera.

Another object of the present invention is to estimate distortion correction parameters with high precision even when a pattern is not placed on a plane perpendicular to the optical axis of a camera.

In order to achieve an object of the present invention, for example, an information processing method of the present invention comprises the following arrangement.

That is, an information processing method for estimating correction parameters including an aspect ratio, a radial distortion parameter of an N-th degree, and a radial distortion parameter of an M-th (M>N) degree, comprising:

an acquisition step of acquiring a captured image obtained by capturing a pattern image including indices by an image capturing apparatus;

a detection step of detecting the indices from the captured image;

a first estimation step of estimating the aspect ratio and the radial distortion parameter of the N-th degree using image positions of the detected indices while the radial distortion parameter of the M-th (M>N) degree is fixed; and a second estimation step of estimating the radial distortion parameter of the M-th (M>N) degree using the image positions of the detected indices while the estimated aspect ratio and the estimated radial distortion parameter of the N-th degree are fixed.

In order to achieve an object of the present invention, for example, an information processing apparatus of the present invention comprises the following arrangement.

That is, an information processing apparatus for estimating correction parameters including an aspect ratio, a radial distortion parameter of an N-th degree, and a radial distortion parameter of an M-th (M>N) degree, comprising:

acquisition unit adapted to acquire a captured image obtained by capturing a pattern image including indices by an image capturing apparatus;

detection unit adapted to detect the indices from the captured image;

first estimation unit adapted to estimate the aspect ratio and the radial distortion parameter of the N-th degree using image positions of the detected indices while the radial distortion parameter of the M-th (M>N) degree is fixed; and second estimation unit adapted to estimate the radial distortion parameter of the M-th (M>N) degree using the image positions of the detected indices while the estimated aspect ratio and the estimated radial distortion parameter of the N-th degree are fixed.

Further features of the present invention will be become apparent from the following description of exemplary embodiments with reference to the attached drawings.

BRIEF DESCRIPTION OF THE DRAWINGS

FIG. 5 is a flowchart of processing for calibrating parameters associated with the camera 101.

DESCRIPTION OF THE EMBODIMENTS

Preferred embodiments of the present invention will now be described in detail in accordance with the accompanying drawings.

First Embodiment

Figure 1:
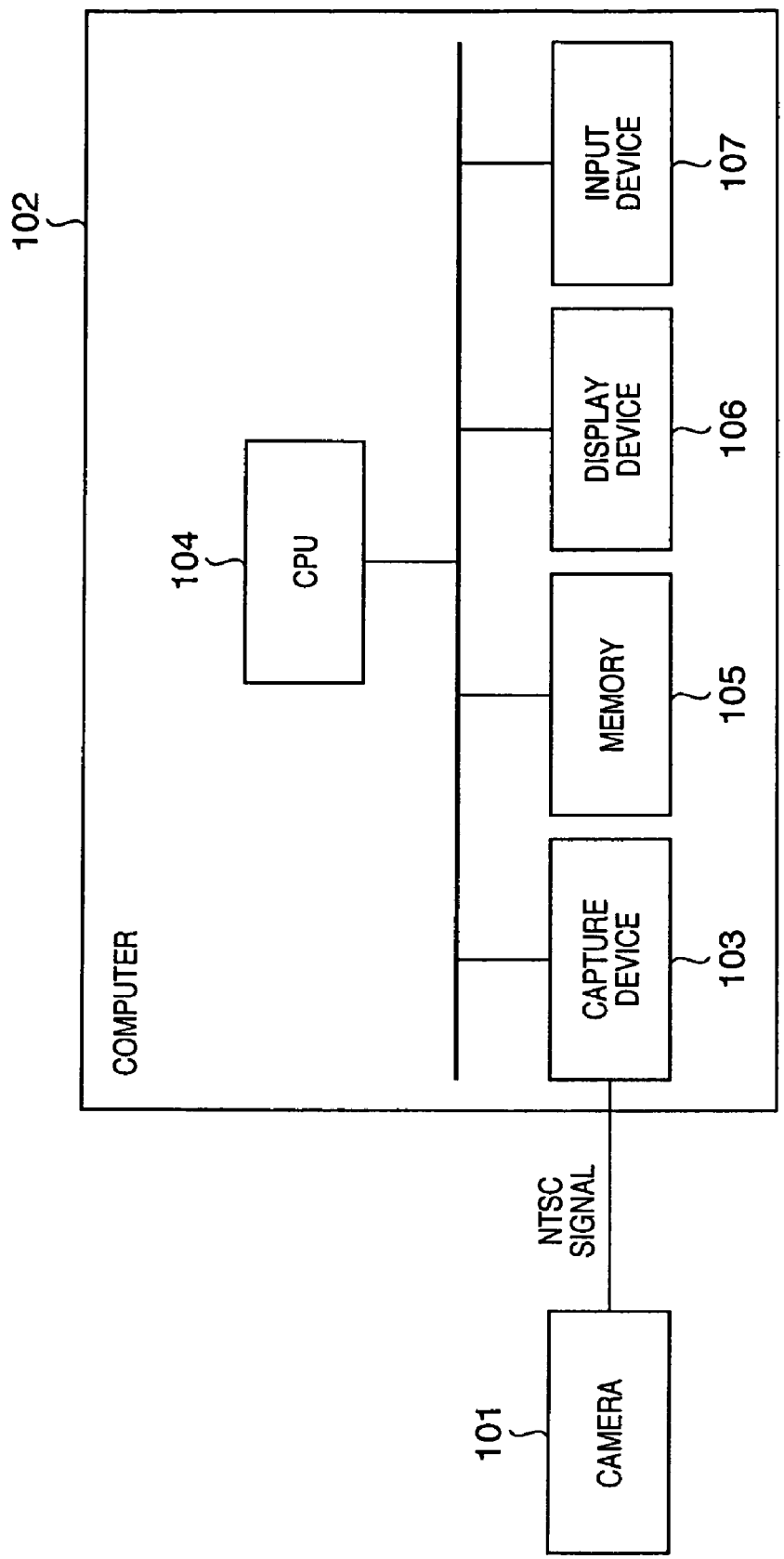
FIG. 1 is a block diagram showing an example of the hardware arrangement of a system which includes a camera 101 as an image capturing apparatus and a computer 102 which executes correction processing.

FIG. 1 is a block diagram showing an example of the hardware arrangement of a system which includes a camera 101 as an image capturing apparatus and a computer 102 which executes correction processing.

The camera 101 is a popular video camera which complies with NTSC, and has a radial distortion of a lens. An image captured by the camera 101 is output to the computer 102 as an NTSC signal.

The computer 102 comprises a capture device 103, CPU 104, memory 105, display device 106, and input device 107. Note that the arrangement of the computer 102 is not limited to that shown in FIG. 1, and modifications may be made as needed.

The capture device 103 receives the NTSC signal output from the camera 101, converts it into data (image data), and outputs the image data to the memory 105.

The CPU 104 controls the overall computer 102 using programs and data stored in the memory 105, and executes respective processes to be described later which are implemented by the computer 102.

The memory 105 can provide various areas as needed such as an area for temporarily storing image data output from the capture device 103, a work area used when the CPU 104 executes various processes, and the like. Note that this work area also includes an area for temporarily storing data (already processed image data) as a result of various processes to this image data by the CPU 104.

The display device 106 comprises a CRT, liquid crystal display, or the like, and can display images, text, and the like.

The input device 107 includes a keyboard, mouse, and the like, and can issue various instructions to the CPU 104 when the input device is operated by the operator.

Figure 2:
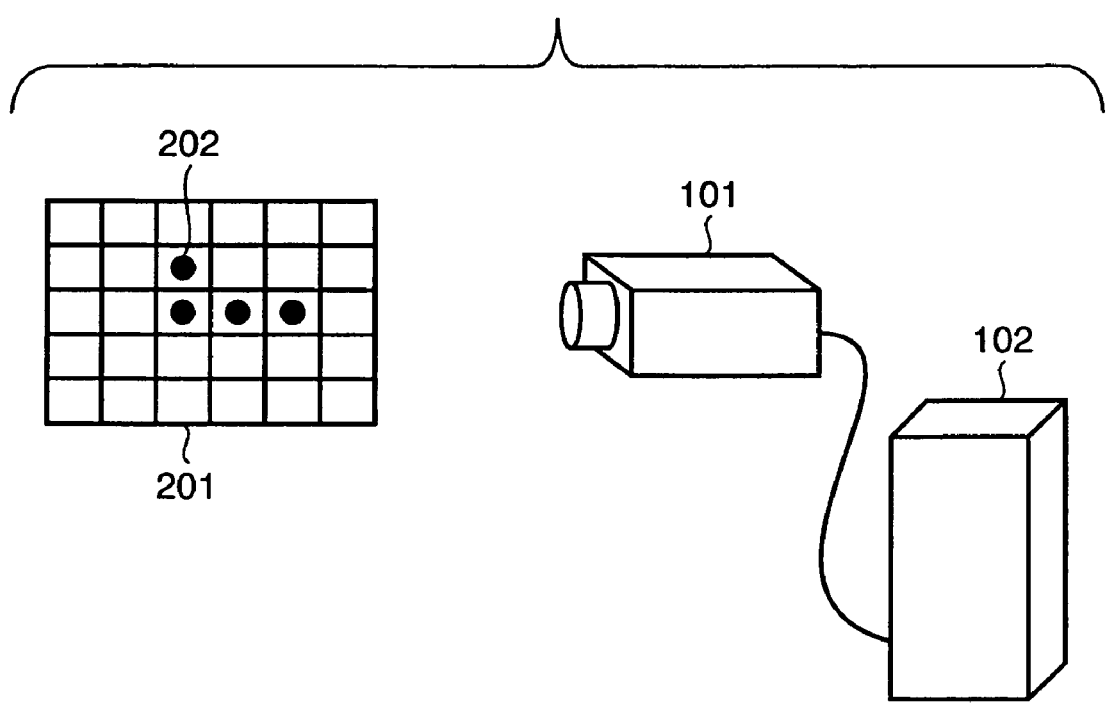
FIG. 2 is a view showing a state wherein parameters associated with the camera 101 are calibrated (corrected) using the system according to the first embodiment.
Figure 3:
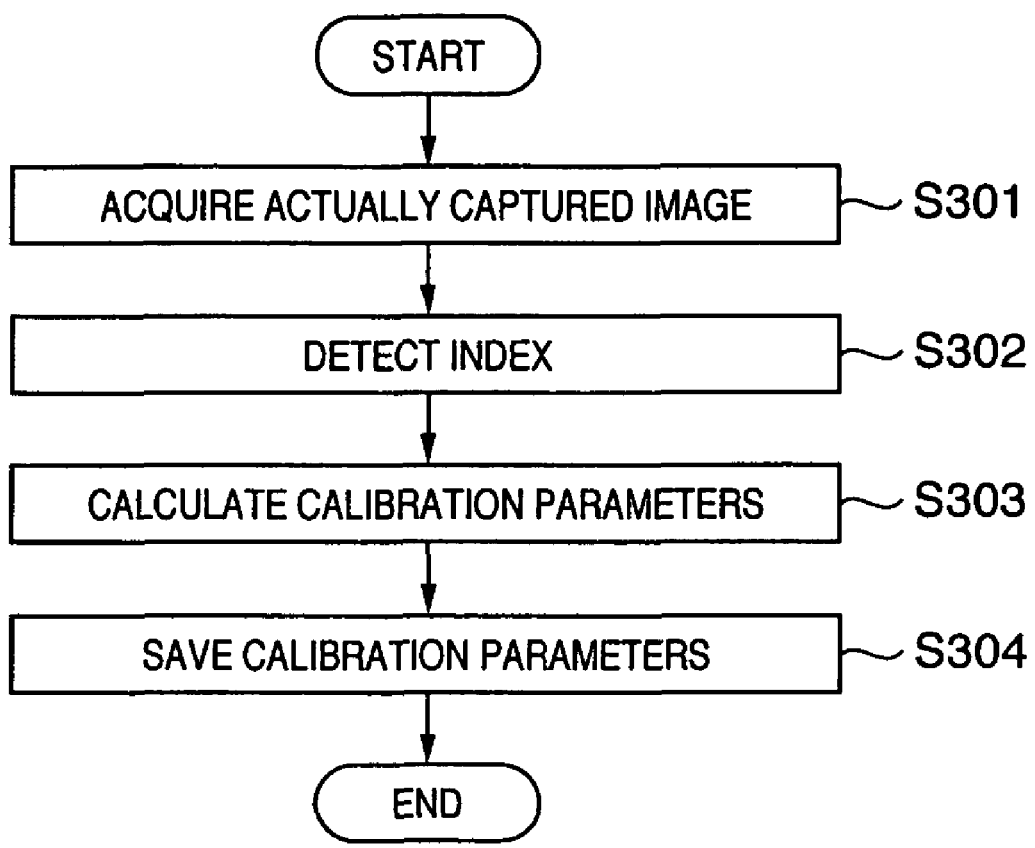
FIG. 3 is a flowchart of the conventional distortion parameter calculation processing.

FIG. 2 is a view showing a state wherein parameters associated with the camera 101 are calibrated (corrected) using the aforementioned system. Note that the same reference numerals in FIG. 2 denote the same parts as in FIG. 1, and a description thereof will be omitted.

Reference numeral 201 denotes a calibration pattern which is used to calibrate the parameters associated with the camera 101, and is, for example, a paper sheet on which a predetermined pattern is printed. Black points 202 will be described later.

In this embodiment, an image of such pattern is captured by the camera 101, and the captured image is output to the computer 102. The camera 101 has a lens distortion. Therefore, the captured image of the pattern is influenced by this lens distortion.

Figure 4:
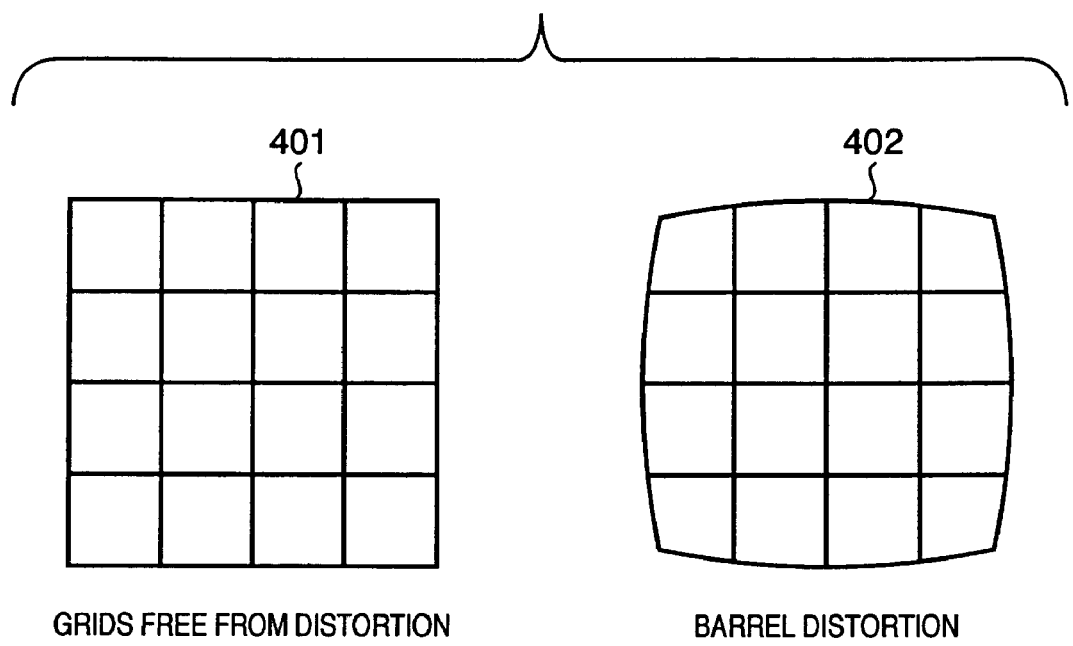
FIG. 4 shows a general barrel distortion.

Reference numeral 402 shown in FIG. 4 shows a general barrel distortion. When an image of the calibration pattern on which grids are printed is captured using an ideal lens free from any distortion, a grid image 401 free from any distortion can be acquired. However, due to a lens distortion, for example, an image 402 having a barrel distortion is captured in practice.

Such distortion causes registration errors upon compositing an actually captured image and virtual reality video in a mixed reality apparatus or the like. Also, such distortion causes errors in position measurement using an image.

Hence, according to this embodiment, the parameters associated with the camera 101 are calibrated to prevent deformation of a captured image due to a lens distortion, as exemplified by the image 402.

FIG. 5 is a flowchart of processing for calibrating the parameters associated with the camera 101. Note that programs and data for making the CPU 104 execute the processing in FIG. 5 are stored in the memory 105. When the CPU 104 executes the processing using these programs and data, the computer 102 implements respective processes to be described below.

This embodiment uses:

$$x' = k_q \times (x_i - c_x)$$

$$y' = k_q \times k_{v2h} \times (y_i - c_y)$$

$$d = 1 - k_c(x'^2 + y'^2)$$

$$x_o = x' \times d + c_x$$

$$y_o = y' \times d + c_y \qquad (2)$$

where $(x_i, y_i)$ represents an ideal position free from any distortion, and $(x_o, y_o)$ represents a distorted position. $k_c$ is a cubic parameter of a radial distortion, $k_q$ is a quintic parameter of the radial distortion, and $k_{v2h}$ is a parameter indicating the aspect ratio. $(c_x, c_y)$ includes parameters indicating the distortion central position.

In this manner, the distortion correction parameters include the cubic parameter $k_c$ of the radial distortion, the quintic parameter $k_q$ of the radial distortion, the aspect ratio $k_{v2h}$, and the distortion central position $(c_x, c_y)$.

The perspective projection conversion parameters to be estimated in camera calibration include a focal length $(f_x, f_y)$ and a principal point position ($p_x$, $p_y$), and extrinsic parameters include a position "position" and an orientation "orientation".

The focal length $f_x$ is a parameter associated with the field angle in the horizontal direction, and the focal length $f_y$ is a parameter associated with the field angle in the vertical direction.

As described above, in this embodiment, the parameters associated with the camera 101 include $k_c$, $k_q$, $k_{v2h}$, $c_x$, $c_y$, $f_x$, $f_y$, $p_x$, $p_y$, position, and orientation.

Note that the focal lengths and the aspect ratio theoretically have the following relationship:

$$f_y = f_x \times k_{v2h}$$

The focal lengths ($f_x$, $f_y$) are used as perspective projection parameters, and the aspect ratio $k_{v2h}$ is used as a distortion correction parameter. That is, the focal lengths ($f_x$, $f_y$) and the aspect ratio $k_{v2h}$ are independently used. Hence, the focal lengths ($f_x$, $f_y$) and the aspect ratio $k_{v2h}$ obtained as a result of the optimization processing of this embodiment do not always meet the above equation.

In step S501, initial parameters are estimated. Initial values of $k_c$ and $k_q$ can be set to zero unless the lens of the camera 101 has an exceptionally large distortion. Initial values of the distortion center ($c_x$, $c_y$) can be set at the center of an image (an image captured by the camera 101) unless a special lens is used. When a special lens is used as that of the camera 101, initial parameters of the distortion are set accordingly.

As an initial value of $k_{v2h}$, a theoretical value of an equipment used can be set. When a general computer is used to capture a video signal compliant to NTSC, a video signal can be captured at an aspect ratio of about 1:1. Therefore, "1:1" is set as the parameter $k_{v2h}$ indicating the aspect ratio. Note that the aspect ratio includes errors, but it does not pose any problem as an initial value used in this case.

The perspective projection parameters and extrinsic parameters ($f_x$, $f_y$, $p_x$, $p_y$, position, orientation) are estimated by camera parameter estimation calculations using an inter-image homography based on layout information (the positions of the black point 202, the distance between the intersections of grids, and the like) of the pattern. Corresponding points of grids between a plurality of images are specified with reference to the black points 202.

In step S502, lines are detected from the image of the calibration pattern captured by the camera 101, and intersections of the detected lines (the intersections of grids shown in FIG. 2) are detected. Let ($x_o$, $y_o$) be the coordinate position of each detected intersection (to be referred to as an observation point or index hereinafter) on the image.

In this embodiment, since the perspective projection parameters and extrinsic parameters of the camera 101 are simultaneously estimated, a plurality of images having different positional relationship between the camera 101 and the calibration pattern 201 are acquired. In order to estimate a distortion more precisely over the entire image region, it is desirable that grids fully appear in each individual image region.

In step S503, $f_x = f_y = f$ (predetermined value) is set. This is because the difference between the magnitudes of the focal length parameters $f_x$ and $f_y$ is essentially the same as the aspect ratio $k_{v2h}$, and as a residual error after one is estimated, the other is estimated.

In step S504, the quintic distortion coefficient $k_q$ is fixed to zero.

In the prior art, parameter estimation is done while fixing the aspect ratio. However, the distortion model equations of equations (2) are premised on that the aspect ratio is accurate. If the aspect ratio includes errors, a model having different intensities of the radial distortion in the vertical and horizontal directions is generated.

The variation amount according to the quintic parameter $k_q$ of the radial distortion assumes a very small value compared to that according to the cubic parameter $k_c$ of the radial distortion and that according to the aspect ratio $k_{v2h}$. Therefore, when $k_q$ is estimated simultaneously with $k_c$ and $k_{v2h}$, $k_q$ is buried in calculation errors and cannot be converged. Also, since $k_c$ and $k_q$ have a strong relation with each other, if they are estimated at the same time, they are likely to lapse into a local solution. Hence, in this embodiment, the quintic distortion coefficient $k_q$ is fixed to zero initially, and other parameters are estimated.

In this way, in this embodiment, the aspect ratio $k_{v2h}$ is estimated in preference to the quintic parameter (estimation of $k_q$) of the radial distortion required to accurately correct the radial distortion. Then, on the image plane, the aspect ratio of which is corrected, the quintic parameter $k_q$ of the radial distortion (estimation of $k_q$) free from any bias in all directions from the lens center is estimated.

Steps S505 to S507 as processes for estimating other parameters will be explained below.

In step S505, using the initialized parameters, perspective projection of the observation points on the pattern coordinate system onto the image plane is made and lens distortion inverse correction is performed. In this step, the coordinates ($x_p$, $y_p$) of positions to which the observation points are to be mapped on the image plane are calculated.

In step S506, using the differences between the coordinates ($x_p$, $y_p$) calculated in step S505 and the coordinate positions ($x_o$, $y_o$) of the observation points detected in step S502, the parameters ($c_x$, $c_y$, $k_c$, $k_{v2h}$, f, $p_x$, $p_y$, position, orientation) associated with the camera 101 are corrected (updated) using the Newton method. Since $f_x = f_y = f$ is defined in step S503, the parameter of the focal lengths is only f.

At this time, in the Newton method, $\partial x_i / \partial c_x$, $\partial x_i / \partial c_y$, $\partial x_i / \partial k_c$, $\partial x_i / \partial k_{v2h}$, $\partial x_i / \partial f$, $\partial x_i / \partial p_x$, $\partial x_i / \partial p_y$, $\partial x_i / \partial (\text{position})$, $\partial x_i / \partial (\text{orientation})$, $\partial y_i / \partial c_x$, $\partial y_i / \partial c_y$, $\partial y_i / \partial k_c$, $\partial y_i / \partial k_{v2h}$, $\partial y_i / \partial f$, $\partial y_i / \partial p_x$, $\partial y_i / \partial p_y$, $\partial y_i / \partial (\text{position})$, and $\partial y_i / \partial (\text{orientation})$ are calculated and used.

In step S507, a residual error is calculated, and it is checked if the residual error becomes equal to or smaller than a predetermined value (the parameters to be calculated are optimized). If the residual error is equal to or larger than the predetermined value, the flow returns to step S505 to repeat the processing. Since the numerical calculation processing according to the Newton method is known to those who are skilled in the art, a description thereof will be omitted.

If the residual error becomes equal to or smaller than the predetermined value, the flow advances to step S508.

In the optimization processing in steps S509 and S510, the quintic distortion coefficient $k_q$ is optimized while fixing the parameters ($c_x$, $c_y$, $k_c$, $k_{v2h}$, f, $p_x$, $p_y$, position, orientation) optimized in steps S505 to S507.

That is, on the image plane, the aspect ratio of which is corrected, the quintic parameter $k_q$ of the radial distortion free from any bias in all directions from the lens center is estimated.

In step S508, the parameters calculated in the processes up to step S507 are fixed, and the quintic distortion coefficient $k_q$ is set as a variable. Note that $\partial x_i / \partial k_q$ and $\partial y_i / \partial k_q$ are calculated in advance.

Steps S509 to S511 as the processes for estimating the quintic parameter $k_q$ of the radial distortion will be described below.

In step S509, using the parameters calculated in the processes in steps S505 to S507, perspective projection of the observation points on the pattern coordinate system onto the image plane is made and lens distortion inverse correction is performed. In this step, the coordinates $(x_p, y_p)$ of positions to which the observation points are to be mapped on the image plane are calculated.

In step S510, using the differences between the coordinates $(x_p, y_p)$ calculated in step S509 and the coordinate positions $(x_o, y_o)$ of the observation points detected in step S502, $k_q$ is updated by the Newton method.

In step S511, a residual error is calculated, and it is checked if the residual error becomes equal to or smaller than a predetermined value (the parameter to be calculated is optimized). If the residual error is equal to or larger than the predetermined value, the flow returns to step S509 to repeat the subsequent processing.

It is checked in step S512 if the sum of the residual errors calculated in steps S507 and S511 is equal to or smaller than a predetermined value. If the sum is equal to or larger than the predetermined value, the flow returns to step S505 to repeat the subsequent processing. When the flow returns to step S505, $k_q$ calculated in steps S509 to S511 is used in place of zero.

In step S513, the quintic coefficient $k_q$ finally determined in step S512 and the aspect ratio $k_{v2h}$ are fixed. This is because $k_q$ cannot be estimated simultaneously with $k_c$ in subsequent optimization. The reason why the aspect ratio is fixed is to independently estimate $(f_x, f_y)$ having essentially the same meaning as the aspect ratio.

In step S514, $f_x$ and $f_y$ are set as independent vertical and horizontal parameters, and processes in steps S515 to S517 are executed.

In step S515, using the parameters calculated in the processes in steps S505 to S512, perspective projection of the observation points on the pattern coordinate system onto the image plane is made and lens distortion inverse correction is performed. In this step, the coordinates $(x_p, y_p)$ of positions to which the observation points are to be mapped on the image plane are calculated.

In step S516, using the differences between the coordinates $(x_p, y_p)$ calculated in step S515 and the coordinate positions $(x_o, y_o)$ of the observation points detected in step S502, $f_x$ and $f_y$ are updated using the Newton method.

In step S517, a residual error is calculated, and it is checked if the residual error becomes equal to or smaller than a predetermined value (the parameters to be calculated are optimized). If the residual error is equal to or larger than the predetermined value, the flow returns to step S515 to repeat the processing.

After actual calculations, $f_x$ and $f_y$ assume nearly the same values, but their independent calculations can realize more accurate reproduction.

As for the correction result, the distortion parameters and scale are calculated in advance, and the correction result can be displayed while making conversion using a function incorporated in the display device 106.

As described above, according to this embodiment, in camera calibration, the calibration pattern need not be presented perpendicularly, and easy calibration can be made, thus removing errors caused when the pattern is not presented perpendicularly.

In distortion parameter estimation of the camera, errors of the aspect ratio do not adversely influence the precision of the distortion parameters, and precise estimation can be made.

In this embodiment, the distortion correction parameters, the perspective projection conversion parameters of the camera, and the extrinsic parameters are calculated at the same time. Therefore, the calibration need not be done twice unlike in the prior art, i.e., after an image for distortion correction parameter calculations is acquired and the distortion correction parameters are calculated, an image for perspective projection conversion parameter calculations of the camera and the perspective projection conversion parameters are calculated.

In the above embodiment, the quintic coefficient $k_q$ is calculated, but this calculation may be omitted. In this case, in the flowchart of FIG. 5, the processes in steps S508 to S512 are omitted.

Even when a lens distortion model (which considers, e.g., a tangential distortion in addition to the radial direction) is different from that of the above embodiment, the distortion parameters and perspective projection conversion parameters can be estimated in consideration of the aspect ratio as in the above embodiment.

In addition, $f_x$ and $f_y$ need not always be separately estimated. In this case, the processes in steps S513 to S517 can be omitted.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of function extension card or a function extension unit, which is inserted in or connected to the computer. After that, the functions of the above-mentioned embodiments are implemented by some or all of actual processing operations executed by a CPU or the like arranged in the function extension card or function extension unit based on an instruction of the program code. Such case is also included in the present invention.

When the present invention is applied to the recording medium, that recording medium stores program codes corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-221466, filed Jul. 29, 2005, which is hereby incorporated by reference herein in its entirety.

What is claimed is:

1. An information processing method, comprising:
    an acquisition step of acquiring an image obtained by capturing an index arranged in a physical space using a camera;

a first calculation step of calculating a coordinate position $(x_o, y_o)$, in the image, of the index captured in the image;

a second calculation step of calculating a projection position $(x_p, y_p)$ obtained by projecting an index arranged in the physical space onto the image, by using a camera parameter, wherein the camera parameter includes $k_c$ being a cubic parameter of a radial distortion, $k_q$ being a quintic parameter of the radial distortion, $k_{v2h}$ being a parameter indicating aspect ratio, $(c_x, c_y)$ being parameters indicating a distortion central position, $(f_x, f_y)$ being a focal length, and $(p_x, p_y)$ being a principal point position, and the $k_q$ is fixed to zero;

a first correction step of correcting, according to the Newton method, the camera parameter in which the $k_q$ is fixed to zero, by using a difference between the projection position $(x_p, y_p)$ calculated in the second calculation step and the coordinate position $(x_o, y_o)$ calculated in the first calculation step;

a third calculation step of calculating a projection position $(x_p, y_p)$ obtained by projecting an index arranged in the physical space onto the image, by using the camera parameter corrected in the first correction step;

a second correction step of correcting, according to the Newton method, the $k_q$ included in the camera parameter corrected in the first correction step, by using a difference between the projection position $(x_p, y_p)$ calculated in the third calculation step and the coordinate position $(x_o, y_o)$ calculated in the first calculation step;

a fourth calculation step of calculating a projection position $(x_p, y_p)$ obtained by projecting an index arranged in the physical space onto the image, by using the camera parameter corrected in the second correction step; and a third correction step of correcting, according to the Newton method, the camera parameter which is corrected in the second correction step and in which the $k_q$ and $k_{v2h}$ are fixed, by using a difference between the projection position $(x_p, y_p)$ calculated in the fourth calculation step and the coordinate position $(x_o, y_o)$ calculated in the first calculation step.

2. An information processing apparatus, comprising:

an acquisition unit that acquires an image obtained by capturing an index arranged in a physical space using a camera;

a first calculation unit that calculates a coordinate position $(x_o, y_o)$, in the image, of the index captured in the image;

a second calculation unit that calculates a projection position $(x_p, y_p)$ obtained by projecting an index arranged in the physical space onto the image, by using a camera parameter, wherein the camera parameter includes $k_c$ being a cubic parameter of a radial distortion, $k_q$ being a quintic parameter of the radial distortion, $k_{v2h}$ being a parameter indicating aspect ratio, $(c_x, c_y)$ being parameters indicating a distortion central position, $(f_x, f_y)$ being a focal length, and $(p_x, p_y)$ being a principal point position, and the $k_q$ is fixed to zero;

a first correction unit that corrects, according to the Newton method, the camera parameter in which the $k_q$ is fixed to zero, by using a difference between the projection position $(x_p, y_p)$ calculated by said second calculation unit and the coordinate position $(x_o, y_o)$ calculated by said first calculation unit;

a third calculation unit that calculates a projection position $(x_p, y_p)$ obtained by projecting an index arranged in the physical space onto the image, by using the camera parameter corrected by said first correction unit;

a second correction unit that corrects, according to the Newton method, the $k_q$ included in the camera parameter corrected by said first correction unit, by using a difference between the projection position $(x_p, y_p)$ calculated by said third calculation unit and the coordinate position $(x_o, y_o)$ calculated by said first calculation unit;

a fourth calculation unit that calculates a projection position $(x_p, y_p)$ obtained by projecting an index arranged in the physical space onto the image, by using the camera parameter corrected by said second correction unit; and a third correction unit that corrects, according to the Newton method, the camera parameter which is corrected by said second correction unit and in which the $k_q$ and $k_{v2h}$ are fixed, by using a difference between the projection position $(x_p, y_p)$ calculated by said fourth calculation unit and the coordinate position $(x_o, y_o)$ calculated by said first calculation unit.

3. A non-transitory computer-readable storage medium for storing a computer program for causing a computer to function as each unit of an information processing apparatus defined in claim 2.

* * * * *